United States Patent
Boesmann et al.

(10) Patent No.: US 10,450,194 B2
(45) Date of Patent: Oct. 22, 2019

(54) LIQUID COMPOUNDS AND METHOD FOR THE USE THEREOF AS HYDROGEN STORES

(71) Applicant: Bayerische Motoren Werke Aktiengesellschaft, Munich (DE)

(72) Inventors: Andreas Boesmann, Hessdorf (DE); Peter Wasserscheid, Erlangen (DE); Nicole Brueckner, Erlangen (DE); Daniel Teichmann, Munich (DE); Jennifer Dungs, Stuttgart (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 122 days.

(21) Appl. No.: 14/722,443

(22) Filed: May 27, 2015

(65) Prior Publication Data

US 2015/0266731 A1 Sep. 24, 2015

Related U.S. Application Data

(63) Continuation of application No. PCT/EP2013/072156, filed on Oct. 23, 2013.

(30) Foreign Application Priority Data

Nov. 28, 2012 (DE) .................. 10 2012 221 809

(51) Int. Cl.
| | |
|---|---|
| *C01B 3/38* | (2006.01) |
| *B60K 15/03* | (2006.01) |
| *B01J 19/24* | (2006.01) |
| *C01B 3/26* | (2006.01) |
| *C01B 3/00* | (2006.01) |

(52) U.S. Cl.
CPC ................. *C01B 3/26* (2013.01); *B01J 19/24* (2013.01); *B60K 15/03006* (2013.01); *C01B 3/0015* (2013.01); *B01J 2219/24* (2013.01); *B60K 2015/03315* (2013.01); *C01B 2203/066* (2013.01); *C01B 2203/107* (2013.01); *C01B 2203/1052* (2013.01); *C01B 2203/1058* (2013.01); *C01B 2203/1064* (2013.01); *C01B 2203/84* (2013.01); *Y02E 60/321* (2013.01); *Y02E 60/328* (2013.01)

(58) Field of Classification Search
CPC ................................. B01J 19/24; C01B 3/26
See application file for complete search history.

(56) References Cited

U.S. PATENT DOCUMENTS

| | | | | |
|---|---|---|---|---|
| 3,475,115 A | * | 10/1969 | Benning | C09K 5/10 165/104.19 |
| 4,371,726 A | * | 2/1983 | Horita | C07C 2/861 585/2 |
| 4,523,044 A | | 6/1985 | Commandeur et al. | |
| 5,017,733 A | * | 5/1991 | Sato | H01B 3/22 174/17 LF |
| 2006/0204799 A1 | | 9/2006 | Ishikawa et al. | |
| 2008/0260630 A1 | | 10/2008 | Pez et al. | |
| 2009/0000575 A1 | | 1/2009 | Shimada et al. | |

FOREIGN PATENT DOCUMENTS

| | | | | |
|---|---|---|---|---|
| CN | 101575257 A | | 11/2009 | |
| CN | 102101645 A | | 6/2011 | |
| DE | 37 29 526 A1 | | 3/1989 | |
| DE | 10 2006 007 782 A1 | | 9/2006 | |
| DE | 10 2008 030 573 A1 | | 1/2009 | |
| DE | 10 2007 039 478 A1 | | 2/2009 | |
| DE | 10 2008 034 221 A1 | | 1/2010 | |
| EP | 1 475 349 A2 | | 11/2004 | |
| EP | 2 105 601 A1 | * | 9/2009 | .............. C01B 3/04 |
| JP | 57-172992 A | | 10/1982 | |
| JP | 60-87231 A | | 5/1985 | |
| JP | 2005-138024 | * | 6/2005 | |
| JP | 2007-269522 A | | 10/2007 | |

OTHER PUBLICATIONS

JP2005-138024 Translation, Jun. 2005.*
JP2007-269522 Translation, Oct. 2007.*
Arkema GPS Safety Summary for Dibenzyltoluene pp. 1-5, downloaded on Apr. 11, 2018 (Year: 2013).*
M. Götz et al., "Storage of volatile renewable energy in the gas grid applying 3-phase methanation", International Gas Union Research Conference: 2011; pp. 1-15, (Fifteen (15) pages).
D. Teichmann et al., "A future energy supply based on Liquid Organic Hydrogen Carriers (LOHC)," Energy & Environmental Science, The Royal Society of Chemistry 2011, Bd. 4, pp. 2767-2773 (Seven (7) pages).
German Search Report dated Oct. 16, 2014 with partial English-language translation (twelve (12) pages).
International Search Report (PCT/ISA/210) dated Feb. 27, 2014 with English-language translation (six (6) pages).
Chinese Office Action issued in counterpart Chinese Application No. 201380061439.9 dated Jan. 29, 2016 with English-language translation (thirteen (13) pages).
Chinese Office Action issued in counterpart Chinese Application No. 201380061439.9 dated Jul. 11, 2016 with English-language translation (twelve (12) pages).
German-language European Office Action issued in counterpart European Application No. 13780357.3 dated Feb. 3, 2017 (Five(5) pages).
Chinese-language Office Action issued in counterpart Chinese Application No. 201380061439.9 dated Jan. 23, 2017 with English translation (Fifteen (15) pages).

(Continued)

*Primary Examiner* — Douglas B Call
(74) *Attorney, Agent, or Firm* — Crowell & Moring LLP

(57) ABSTRACT

The invention relates to a mixture, which is liquid at room temperature and which is composed of two or more compounds, which are constructed exclusively of the elements carbon and hydrogen and, in individual known compositions, form a synthetic substance mix that can be used as a heat-transfer liquid. The mixture is characterized in that the mixture contains at least one compound having at least two non-condensed, non-pi-conjugated aromatic units and is used in catalytic methods to bind hydrogen to or release hydrogen from the mixture.

11 Claims, 1 Drawing Sheet

(56) References Cited

OTHER PUBLICATIONS

Li W., et al., "Modern Energy and Chemical Engineering Techniques," Chemical Industry Press, First Printing, First Edition, Beijing, May 31, 2011, with English translation (Six (6) pages).
English translation of Japanese-language Office Action issued in counterpart Japanese Application No. 2015-544397 dated Feb. 1, 2017 (Three (3) pages).

* cited by examiner

LIQUID COMPOUNDS AND METHOD FOR THE USE THEREOF AS HYDROGEN STORES

CROSS REFERENCE TO RELATED APPLICATIONS

This application is a continuation of PCT International Application No. PCT/EP2013/072156, filed Oct. 23, 2013, which claims priority under 35 U.S.C. § 119 from German Patent Application No. 10 2012 221 809.2, filed Nov. 28, 2012, the entire disclosures of which are herein expressly incorporated by reference.

BACKGROUND AND SUMMARY OF THE INVENTION

The invention relates to liquid mixtures comprising two or more compounds selected from isomers of benzyltoluene and/or dibenzyltoluene in catalytic processes to bind hydrogen to and/or release hydrogen from the mixture and to a method of using same as hydrogen stores for supplying a consumer with motor fuel.

Currently considered scenarios for large-scale energy production from renewable sources, for example wind parks in the North Sea or Desertec, are technically predicated on suitable ways to ideally transport and store large amounts of energy without loss in order to rectify seasonal variations in generation and to achieve efficient transportation of useful energy over large distances.

A particularly attractive way to meet the challenges described above is to develop new "energy-carrying substances" and to provide technologies for their efficient energy loading and unloading. The use of "energy-carrying substances" presupposes that the energy provided at an "energy-rich" place, at an "energy-rich" time is used, for example, to convert an energy-poor liquid A into an energy-rich liquid B. B is then storable without loss for long periods and transportable at high energy density. When and where energy is required, the conversion of the energy-rich liquid B back into A then releases useful energy. A may be a liquid or a gaseous substance. When A is a liquid as well as B, the concept envisages the possibility of A being returned back to the place of energy generation and reloaded.

A preferred approach to technically realizing an energy transportation and energy storage system on the basis of "energy-carrying substances" involves loading the energy-poor substance A with hydrogen to form the energy-rich substance B, while the hydrogen needed for this is provided from an electrolysis of water by means of preferably renewably generated electrical energy. This operation of energy loading typically takes the form in the prior art of a catalytic hydrogenation reaction under superatmospheric pressure. Substance B is energy unloaded by catalytic dehydrogenation at low pressures and high temperatures. The hydrogen which is released again in the process is useful as energy source in a fuel cell or in a combustion engine for example. Hydrogen released on board a vehicle is directly usable to operate the vehicle. Prior art examples comprise energy storage in the form of $CH_4$, $NH_3$ or methanol. On hydrogen unloading, these compounds give rise to the gaseous substances $CO_2$, in the case of methane and methanol, and nitrogen in the case of $NH_3$.

DE 10 2008 034 221 A1 describes an alternative known concept where the energy-poor form A is a liquid and so the energy unloading reproduces a liquid. The energy-poor form A can in this case be stored and transported as liquid in order to be reloaded with hydrogen at an energy-rich time and at an energy-rich place. Systems of this type are known as liquid organic hydrogen carriers (LOHCs). Examples of such LOHCs are disclosed in patent application EP 1 475 349 A2.

Prior art LOHC systems are preferably substance pairs wherein the energy-poor substance A is a high-boiling functionalized aromatic compound which is hydrogenated in the energy-loading step. One particularly preferred example disclosed relates to using the substance pair N-ethylcarbazole/perhydro-N-ethylcarbazole, which allows energy loading typically at around 140° C. and elevated pressures and energy unloading at temperatures between 230 and 250° C. The energy-rich substance perhydro-N-ethylcarbazole has a hydrogen capacity of around 5.8% by mass of hydrogen in the system referred to. The energy stored in the releasable hydrogen of 100 kg of perhydro-N-ethylcarbazole is accordingly sufficient for a motor vehicle range of about 500 km, while the burning of the hydrogen on board for energy results in the almost exclusive formation of water vapor as combustion product. Hence this approach represents a technically interesting alternative to other energy storage concepts for mobile applications.

Reaction systems for catalytic release of hydrogen from liquid energy storage molecules in the prior art consist of fixed bed reactors or slurry phase reactors. Reactors are also being developed to release hydrogen from a hydrogen-carrying liquid compound which comprise a pressure- and heat-resistant reactor vessel in which at least one function to provide the hydrogen is performable in that the reactor vessel contains at least one body having a metallic supporting structure coated with a solid high-porosity layer containing catalytically active substances for the release of hydrogen from liquid hydrogen-carrying compounds. The hydrogen-carrying liquid compound here may advantageously also be a mixture of hydrogen-carrying liquid compound in an appreciable proportion and other compounds.

Some LOHC systems known from the prior art have heteroatom-carbon compounds. This structural feature activates the systems for the catalytic unloading of hydrogen. However, the distinctly higher loading of the nitrogen-carbon bond—as compared with the carbon-carbon or carbon-hydrogen bond—is also responsible for the fact that the thermal stability of any LOHC systems comprising nitrogen-carbon bonding is limited to temperatures up to 280° C. However, even minimal thermal decomposition of the LOHC system is relevant for technical application, since it adversely affects the fixed point of the LOHC system and the catalytic loadability/unloadability. A high thermal stability allows inter alia reaction temperatures above 280° C. in the catalytic release of hydrogen, resulting in a higher volumetric productivity of hydrogen release compared with lower temperatures.

The problem addressed by the present invention is that of devising a liquid compound which is useful as a hydrogen store, which is providable in large amounts and which is simple to use in technical facilities since it does not have the abovementioned disadvantages in that it is exclusively constructed of carbon and hydrogen and is thermally stable above and beyond 280° C. A method of supplying a consumer with hydrogen by using this liquid compound shall also be provided.

The problem addressed by the invention is solved by a method of using a room temperature liquid mixture comprising two or more compounds selected from isomers of benzyltoluene and/or dibenzyltoluene in catalytic processes to bind hydrogen to and/or release hydrogen from the mixture. Other advantageous embodiments and advantageous methods of supplying a consumer with hydrogen are provided herein.

According to the invention, a room temperature liquid mixture of two or more compounds constructed exclusively of the elements carbon and hydrogen and forming in individual known compositions a synthetic mix of substances which is usable as a heat transfer liquid is characterized in that the mixture contains at least one compound having two or more non-fused non-pi-conjugated aromatic units and is used in catalytic processes to bind hydrogen to and/or release hydrogen from the mixture.

The mixture which in the hydrogen-poor form is already used as heat transfer oil, for example under the brandname Marlotherm LH or Marlotherm SH (from SASOL for example), in certain variants to be used as a liquid hydrogen storage and transportation system, is novel and inventive because the possibility of hydrogen loading the mixture has hitherto not been considered anywhere and the hydrogen loading makes possible a novel use through an inventive process. This also holds for the process of hydrogen release from the previously unknown use of the hydrogen-rich form as hydrogen carrier. This is because particularly the mixture has many important, previously unknown advantages over the prior art liquid hydrogen storage and transportation systems, viz., a high hydrogen capacity, low vapor pressure, high chemical and thermal stability coupled with inexpensive industrial availability, known and unconcerning toxicity and eco-toxicity, and compatibility with all sealant and tank materials. The use of heat transfer oils as LOHC system is an advantageous way to avoid the disadvantageous behavior of previously used LOHC systems due to their limited thermal stability.

An advantageous method of fully or partially supplying a consumer with hydrogen, by using a mixture of the present invention, is notable in that a first storage tank for the hydrogen-carrying mixture supplies said mixture to a reactor via a feed line and the mixture dehydrogenated in the reactor at high temperature and low pressure is discharged from the reactor into a second storage tank via a discharge line, wherein the reactor supplies a consumer with hydrogen via a connecting line. Such a method is particularly advantageous to use when the consumer is an internal combustion engine or at least a fuel cell and, more particularly, contributes to the energy supply of a motor vehicle. The first and second storage tanks may be in communication with one another, even to the point where their respective contents become commingled.

A preferred method according to the invention is characterized in that the mixture is contacted in the reactor with a metal-containing catalyst and binds or releases hydrogen in the process, wherein the metal-containing catalysts used for hydrogen loading and hydrogen unloading are identical or different solid catalysts comprising one or more of the metals palladium, nickel, platinum, iridium, ruthenium, cobalt, rhodium, copper, gold, rhenium and iron in finely divided form on a porous apolar carrier.

What is common to all the aforementioned methods is that hydrogen is released in the reactor from the hydrogen-laden mixture by catalytic dehydrogenation at high temperature and low pressure.

The concept of energy-carrying heat transfer oils which finds application here has the advantage that it is technically close to our existing energy supply with fossil fuels and therefore allows useful existing infrastructure, such as ships, refineries or gas stations, to be used. More particularly, energy-carrying heat transfer oils can store energy surpluses from renewable production and link them to the energy required for mobility, heating and transportation in the present-day infrastructure. These energy stores further have the following advantages: a nearly unlimited lossless storage capacity, a high energy density and low costs. They are further useful as a long-term store and transportation form of energy.

Tests using commercially available heat transfer oils such as Marlotherm LH or Marlotherm SH (from SASOL for example) as a hydrogen-unloaded form of an LOHC system have shown that the mixture which forms the hydrogen storage and transportation system should in the hydrogen-poor form A advantageously contain compounds having two or more non-fused aromatic units in a mass fraction between 5% and 100%, preferably between 60 and 100% and more preferably between 90 and 100%. It is further advantageous for the mixture to comprise above 50%, preferably above 90%, of different compounds which all contain at least two non-fused aromatic units.

Dibenzyltoluene may advantageously be a compound in the hydrogen-poor form of the mixture forming the hydrogen storage and transportation system. It is more advantageous for the mixture to comprise above 50%, preferably above 90% of different dibenzyltoluenes. This ensures that the hydrogen-poor form is convertible via a catalytic hydrogenation reaction, by hydrogen uptake, into a hydrogen-rich form in which the loaded hydrogen may be present in a chemically bonded form at a mass fraction of at least 6%, in which case the hydrogen pressure in the catalytic hydrogenation is between 5 and 200 bar, preferably between 10 and 100 bar and ideally between 30 and 80 bar and the reaction temperatures of the catalytic hydrogenation are between 20° C. and 230° C., preferably between 50° C. and 200° C., but ideally between 100 and 180° C.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
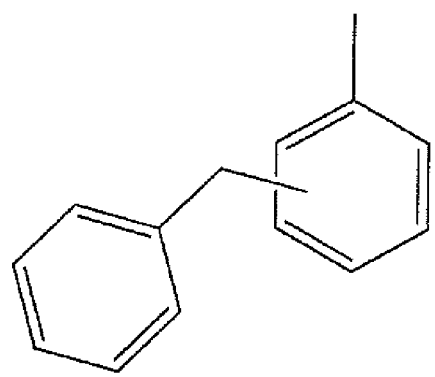
FIG. 1 shows Marlotherm LH (SASOL) with the bond of the benzyl group into the center of the ring, where it is an isometric mix with the benzyl group attached in positions 2, 3 or 4 relative to the methyl group of the toluene moiety (position 1).

General examples of heat carriers advantageously useful as hydrogen carriers will now be adduced and described with reference to three figures. Marlotherm (from SASOL for example) or similar technically utilized heat carrier oils are mixtures of different isomers of benzyltoluene (Marlotherm LH, SASOL) and dibenzyltoluene (Marlotherm SH, SASOL). The different isomers differ because the benzyl groups on the central toluene ring are attached to the central toluene ring at different ring positions in relation to the methyl group of the toluene. When the methyl group of the toluene ring is assigned ring position 1, Marlotherm LH (SASOL) is a mixture of benzyltoluenes whose benzyl group is attached to the toluene ring at positions 2, 3 or 4. FIG. 1 thus symbolizes for Marlotherm LH (SASOL), depicted with the bond of the benzyl group into the center of the ring, that it is an isomeric mix wherein the benzyl group is attached in positions 2, 3 or 4 relative to the methyl group of the toluene moiety (position 1).

Figure 2:
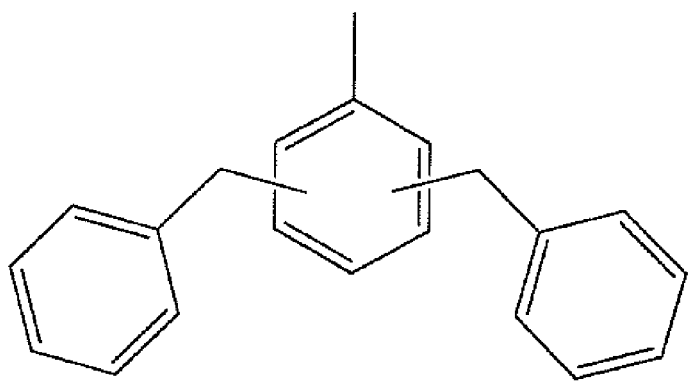
FIG. 2 shows Marlotherm SH (SASOL), the bonds of the benzyl groups into the center of the ring symbolizing an isomeric mix where the benzyl groups are attached in positions 2 and 3, 2 and 4, 2 and 5, 2 and 6, 3 and 4 or 3 and 5 relative to the methyl group on the toluene moiety (position 1).

Marlotherm SH (SASOL) is a mix of dibenzyltoluene. When the methyl group on the toluene ring is again assigned ring position 1, then the two benzyl groups in Marlotherm SH (SASOL) are attached in positions 2 and 3, 2 and 4, 2 and 5, 2 and 6, 3 and 4 or 3 and 5. FIG. 2 accordingly shows Marlotherm SH (SASOL), the bonds of the benzyl groups into the center of the ring symbolizing that an isomeric mix is concerned where the benzyl groups are attached in positions 2 and 3, 2 and 4, 2 and 5, 2 and 6, 3 and 4 or 3 and 5 relative to the methyl group on the toluene moiety (position 1).

Figure 3:
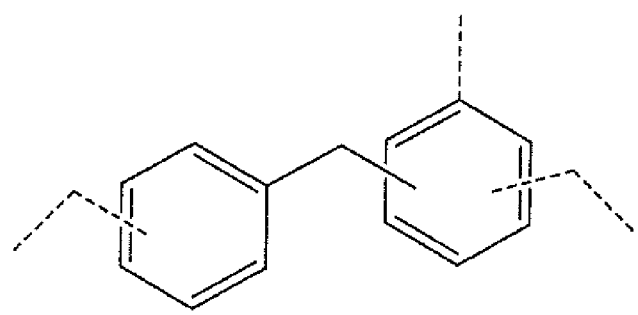
FIG. 3 shows compounds having two or more non-fused non-pi-conjugated aromatic units that may be contained in substance mixes used as heat carriers.

The substance mixes used as heat carriers, under Marlotherm LH (SASOL) and Marlotherm SH (SASOL) and also under other tradenames and other brand owners, for example Hills, can be more generally characterized in that they contain compounds having two or more non-fused non-pi-conjugated aromatic units. A general depiction of a typical structural unit in such mixes is shown by FIG. 3. Typically from one to five benzyl units are attached to a central aromatic core. These benzyl units may each themselves bear further benzyl units and/or other alkylaromatic substituents. In one typical structural unit of substances commercially used as mixes, for example under the tradenames Marlotherm LH (Hüls) or Marlotherm SH (Hüls), as heat transfer oils, the bonding of the benzyl group and of the other substituents into the center of the ring symbolizes that an isomeric mix is concerned where the benzyl group may be attached in different positions relative to the other substituents.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of fully or partially supplying a consumer with hydrogen, comprising using a liquid mixture to bind hydrogen to the liquid mixture catalytically at a hydrogen pressure of 5 to 200 bar and at a reaction temperature between 20° C. and 230° C. and to release hydrogen from the liquid mixture, wherein the liquid mixture comprises two or more compounds selected from isomers of benzyltoluene and/or dibenzyltoluene, wherein the liquid mixture in its hydrogen-rich form, which contains a mass fraction of at least 6% loaded hydrogen, stably retains bonded hydrogen above 280° C., and wherein a first storage tank for the liquid mixture carrying hydrogen supplies the liquid mixture to a reactor via a feed line and the hydrogen-carrying liquid mixture is dehydrogenated in the reactor and the dehydrogenated liquid mixture is discharged from the reactor into a second storage tank via a discharge line, wherein the reactor supplies the consumer with hydrogen via a connecting line.

2. The method according to claim 1, wherein a mass fraction of two or more compounds selected from isomers of benzyltoluene and dibenzyltoluene is more than 50% by mass, based on the overall mass of the liquid mixture.

3. The method according to claim 2, wherein the consumer is an internal combustion engine or at least a fuel cell.

4. The method according to claim 2, wherein the consumer contributes to the energy supply of a motor vehicle.

5. The method according to claim 1, wherein a mass fraction of two or more compounds selected from isomers of benzyltoluene and dibenzyltoluene is more than 90% by mass, based on the overall mass of the liquid mixture.

6. The method according to claim 5, wherein the consumer is an internal combustion engine or at least a fuel cell.

7. The method according to claim 5, wherein the consumer contributes to the energy supply of a motor vehicle.

8. The method according to claim 1, wherein the consumer is an internal combustion engine or at least a fuel cell.

9. The method according to claim 1, wherein the consumer contributes to the energy supply of a motor vehicle.

10. The method according to claim 1, wherein the mixture is contacted in the reactor with a metal-containing catalyst and binds or releases hydrogen in the process, wherein the metal-containing catalysts used for hydrogen loading and hydrogen unloading are identical or different solid catalysts comprising one or more of the metals palladium, nickel, platinum, iridium, ruthenium, cobalt, rhodium, copper, gold, rhenium and iron in finely divided form on a porous apolar carrier.

11. The method according to claim 1, wherein hydrogen is released in the reactor from a hydrogen-laden mixture by catalytic dehydrogenation.

* * * * *